United States Patent
Zhang et al.

(10) Patent No.: US 11,995,069 B2
(45) Date of Patent: May 28, 2024

(54) SYSTEMS AND METHODS FOR A DISTRIBUTED DATABASE TO TRANSITION BETWEEN CENTRALIZED TRANSACTION MANAGEMENT AND GLOBAL CLOCK TRANSACTION MANAGEMENT WITH LITTLE TO NO DOWNTIME

(71) Applicant: HUAWEI TECHNOLOGIES CO., LTD., Shenzhen (CN)

(72) Inventors: Huaxin Zhang, Markham (CA); Ronen Grosman, Markham (CA); Rongzhen Cui, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 17/851,892

(22) Filed: Jun. 28, 2022

(65) Prior Publication Data

US 2023/0418810 A1    Dec. 28, 2023

(51) Int. Cl.
*G06F 16/00* (2019.01)
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC ............................. G06F 16/2379; G06F 16/27
USPC .......................................................... 707/607
See application file for complete search history.

(56) References Cited

PUBLICATIONS

Ranganathan, "Distributed Transactions Without Atomic Clocks," 2019. (Year: 2019).*

(Continued)

*Primary Examiner* — Alexandria Y Bromell

(57) ABSTRACT

A system and method for an online transaction system to transition from operating under a first mode (FM) to operating under a second mode (SM), and vice versa. In the FM, transaction nodes identify transactions with sequential numbers obtained from a global transaction server (GTS). In the SM, transaction nodes identify consecutive transactions with timestamps based on global clock servers (GCSs). When transitioning from one mode to the other mode, a controller instructs the transactions nodes to provide GCS-based transaction timestamps and error bounds to the GTS, which modifies the timestamps and the error bounds based on previously received timestamps and error bounds, and on the latest transaction number issued by the GTS. Modified timestamps and error bounds are obtained at the transaction nodes. Each transaction is timestamped with its respective modified timestamp. But there is a delay equal to the modified error bound before requesting another modified timestamp.

14 Claims, 11 Drawing Sheets

(56) References Cited

PUBLICATIONS

Corbett et al., "Spanner: Google's Globally Distributed Database" 10th USENIX Symposium on Operating Systems Design and Implementation (OSDI '12), Oct. 2012.

Kimball et al. "Living Without Atomic Clocks" Jan. 2022, https://www.cockroachlabs.com/blog/living-without-atomic-clocks/.

Kimball et al. "Living Without Atomic Clocks" Jan. 2022 What happens when node clocks are not properly are not properly synchronized?, https://www.cockroachlabs.com/docs/stable/operational-faqs.html#what-happens-when-node-clocks-are-not-properly-synchronized.

Ranganathan, "Distributed Transaction without Atomic Clocks" 2019.

Shamis et al., "Fast General Distributed Transactions with Opacity" ISBN 978-1-4503-5643-5/19/06, SIGMOD '19, Jun. 30-Jul. 5, 2019.

* cited by examiner

SYSTEMS AND METHODS FOR A DISTRIBUTED DATABASE TO TRANSITION BETWEEN CENTRALIZED TRANSACTION MANAGEMENT AND GLOBAL CLOCK TRANSACTION MANAGEMENT WITH LITTLE TO NO DOWNTIME

CROSS-REFERENCE TO RELATED APPLICATIONS

This is the first application filed for the present invention.

TECHNICAL FIELD OF THE INVENTION

In general, the present disclosure relates to systems and method for online transaction processing (OLTP) in a distributed network. In particular, the present disclosure relates to system and methods for OLTP where all the transaction nodes in the distributed network obtain timestamps from a same centralized server or where the transaction nodes can obtain timestamps from several servers.

BACKGROUND

Online transaction processing (OLTP) is a known type of data processing that conducts transactions sequentially at one or more transaction nodes. OLTP may occurs in a distributed database. Each OLTP transaction queries and updates data in a database. Examples of OLTP applications include online shopping, banking, text messaging, etc. The OLTP transactions are recorded in the database and are readable for accounting or reporting purposes. Each OLTP transaction typically requires to be identified by transaction numbers (beginning transaction number and ending transaction number) or timestamps (beginning timestamp and ending timestamp). Any earlier transaction that is attributed an ending transaction number or an ending timestamp that is less than the beginning transaction number or the beginning timestamp of a subsequent transaction will be visible to the subsequent transaction.

Different types of transaction management in OLTP are known and include global clock management (GCM) and global transaction management (GTM). Under GCM, the timestamps can be determined according to the internal clock of the transaction node conducting the transaction, where the time of the internal clock is based on global clock servers (GCSs) coupled to the transaction nodes. The internal clock of each transaction node can be periodically synchronized to different GCSs that are coupled to a high precision clock such as, for example, a GPS clock or an atomic clock. Under GTM, transaction nodes conducting transactions may obtain sequence-based identification (SBID) numbers (values) from a single global transaction server (GTS). The GTS is typically configured to issue SBID number to sequential transactions.

Because the GTS can be closer to some transaction nodes than to others, there can be noticeable clock skew between the transaction nodes. Because of clock skew, it is possible for the beginning identification number of a subsequent transaction to be smaller than the ending identification number of an initial transaction. In this situation, the inconsistency between the identification numbers prevents the subsequent transaction to take place.

In contrast to GTM, GCM does not rely on a single GTS to provide timestamps. Rather, GCM relies on multiple GCSs that can be co-located with the transactions nodes and synchronized to a same reference clock. The transaction nodes have an internal clock from which timestamps are obtained. The internal clock may be periodically synchronized to a GCS. The GCSs are typically equipped with high precision clock hardware that timestamps the GCM transactions. Because multiple instances of high precision clock hardware are required, GCM may be more expensive than GTM.

As geographically distributed databases become increasingly large, the centralized nature of GTM can become a bottleneck and a point of failure. Transitioning a distributed database to obtain timestamps from GCSs can improve the database's performance, scalability, and reliability. However, such transitioning can result in system downtime required to bring down the distributed database, stop or abort transaction processing, and block new transactions. Such downtime is undesirable, particularly for a distributed database on which many cloud systems depend.

As for GCM, the potential failure of hardware at the clock servers can lead to OLTP failure. When a failure occurs, it can be desirable for a distributed database managed using GCM to switch to a GTM system. However, switching to GTM can bring about further issues, such as downtime while switching from GCM to GTM, and more downtime when switching back from GTM to GCM.

Switching from GCM to GTM may also be needed if an operator wishes to downgrade from GCM to GTM to save the costs of high precision clock hardware. However, downgrading to GTM will generally result in downtime.

Therefore, improvements in switching from GTM to GCM, and vice versa, are desirable.

This background information is provided to reveal information believed by the applicant to be of possible relevance to the present invention. No admission is necessarily intended, nor should be construed, that any of the preceding information constitutes prior art against the present invention.

SUMMARY

Embodiments of the present disclosure generally provide systems and methods that, for online transactions, enable transitioning from a first mode where sequential transactions are identified with sequential identification numbers obtained from a global transaction server to a second mode where sequential transactions are identified by timestamps based on global clock servers, and vice versa. Embodiments of the present disclosure enable transitioning from the second mode to the first mode. Embodiments of the present disclosure allow seamless transitioning from one mode to the other mode to occur rapidly and without any database downtime.

According to another embodiment of the present disclosure, there is provided a method for an online transaction system to transition from operating under a first mode where transactions nodes identify sequential transactions with sequential identification numbers obtained from a global transaction server (GTS) to a second mode where the transaction nodes identify consecutive transactions with timestamps based on global clock servers (GCSs) coupled to the transaction nodes. The method comprises, at a controller coupled to the transaction nodes and to the GTS, instructing the transaction nodes and the GTS to operate under a transition mode. The controller obtains confirmation that each transaction node is operating under the transition mode. Each transaction node is configured to, when operating under the transition mode, provide to the GTS timestamps and timestamp error bounds based on the GCSs. After having obtained confirmation that each transaction node is operating under the transition mode, the controller obtains a largest error bound value (Max_eb) from all the error bounds received at the GTS and instructs the transaction nodes to operate under the second mode but to wait for a duration equal to at least the Max_eb before issuing any timestamp under the second node.

In various examples of the previous embodiment, the controller instructs the GTS to operate under the first mode. When operating under the first mode, the GTS is configured to periodically receive, from the GCSs, upper bound timestamp values. The GTS is configured to issue, upon request from a transaction node operating under the first mode, a transaction identification number greater than any of the upper timestamp values.

In various examples of the previous embodiment, the controller instructs the GTS to reset Max_eb to zero after obtaining Max_eb from the GTS.

According to a further embodiment of the present disclosure, there is provided a method for an online transaction system to transition from operating under a first mode where a plurality of transactions nodes identify sequential transactions with sequential identification numbers obtained from a global transaction server (GTS) to a second mode where the plurality of transaction nodes identify consecutive transactions with timestamps based on global clock servers (GCSs) coupled to the transaction nodes. The method comprises, at a transaction node of the plurality of transaction nodes, receiving a command to operate under a transition mode. When in the transition mode, the transaction node obtains, for a transaction conducted at the transaction node, a timestamp (ts) and a timestamp error bound (eb). The ts and the eb are based on the GCSs. The transaction node provides ts and eb to the GTS operating under the transition mode and receives, from the GTS, a modified timestamp (ts_reply) and a modified error bound (eb'). The transaction node then timestamps the transaction with ts_reply and waits for a time interval of eb' prior to providing any further timestamp and timestamp error bound to the GTS.

In various examples of the preceding embodiment, receiving the command to operate under the transition mode includes receiving the command from a controller. The method further comprising, at the transaction node, confirming to the controller that the transaction node is operating under the transition mode.

In various examples of the preceding examples, the method further comprises, obtaining from the controller, a command to operate under the second mode.

According to an additional embodiment of the present disclosure, there is provided a method for an online transaction system to transition from operating under a first mode where transaction nodes identify consecutive transactions with timestamps based on global clock servers (GCSs) coupled to the transaction nodes, to operating under a second mode where the transactions nodes identify sequential transactions with sequential identification numbers obtained from a global transaction server (GTS). The method comprises, at the GTS, receiving a command to switch from operating under the first mode to operating under a transition mode. When the GTS is operating under the transition mode, for a transaction initiated after the GTS switched to operating under the transition mode, the GTS receives a transaction timestamp (ts) and an error bound (eb) of the timestamp from a transaction node. The ts and the eb are based on the GCSs. The GTS has associated thereto, an identification number of a last transaction conducted by the GTS, timestamps previously received (previous_tss) at the GTS, and error bounds of the timestamps previously received (previous_ebs) at the GTS. The GTS obtains a modified timestamp (ts_reply) by determining a maximum value between the ts, the previous_tss, and the identification number of the last transaction incremented by a pre-determined increment value. The GTS determines a modified error bound (eb') by adding the eb to a difference between ts_reply and ts, and provides the ts_reply and the eb' to the transaction node that provided the ts and the eb to the GTS to cause the transaction node to timestamp the transaction with ts_reply, and to wait for a duration of eb' before requesting any further timestamp.

In yet another embodiment of the present disclosure, there is provided a method for an online transaction system to transition from operating under a first mode where transaction nodes identify consecutive transactions with timestamps based on global clock servers (GCSs) coupled to the transaction nodes, to operating under a second mode where the transactions nodes identify sequential transactions with sequential identification numbers obtained from a global transaction server (GTS). The method comprises, at a controller coupled to the transaction nodes and to the GTS, instructing the transaction nodes and the GTS to operate under a transition mode, and after the controller receives confirmation that each transaction node is operating under the transition mode, instructing the transaction nodes to operate under the second mode.

In yet a further embodiment of the present disclosure, there is provided method for an online transaction system to transition from operating under a first mode where transaction nodes identify consecutive transactions with timestamps based on global clock servers (GCSs) coupled to the transaction nodes, to operating under a second mode where the transactions nodes identify sequential transactions with sequential identification numbers obtained from a global transaction server (GTS). The method comprises, at a transaction node of the plurality of transaction nodes, receiving a command to operate under a transition mode. When in the transition mode, the transaction node obtaining, for a transaction conducted at the transaction node, a timestamp (ts) and a timestamp error bound (eb), the ts and the eb being based on the GCSs. The transaction node provides ts and eb to the GTS operating under the transition mode, and receives from the GTS a modified timestamp (ts_reply) and a modified error bound (eb'). The transaction node timestamps the transaction with ts_reply.

According to an embodiment of the present disclosure, there is provided a method for an online transaction system to transition from operating under a first mode where transactions nodes identify sequential transactions with sequential identification numbers obtained from a global transaction server (GTS) to a second mode where the transaction nodes identify consecutive transactions with timestamps based on a global clock servers (GCSs) coupled to the transaction nodes. The method comprises, at the GTS, receiving a command to switch from operating under the first mode to operating under a transition mode. When the GTS is operating under the transition mode and for a transaction initiated after the GTS switched to operating under the transition mode, the GTS receives a transaction timestamp (ts) and an error bound (eb) of the timestamp from a particular transaction node. The ts and the eb being based on the GCSs. The GTS hasg associated thereto an identification number of a last transaction conducted by the GTS, timestamps previously received (previous_tss) at the GTS, and error bounds of the timestamps previously received (previous_ebs) at the GTS. The GTS obtains a modified timestamp (ts_reply) by determining a maximum value between the ts, the previous_tss, and the identification number of the last transaction incremented by a pre-determined increment value. The GTS then determines a modified error bound (eb') by adding the eb to a difference between ts_reply and ts. And the, the GTS provides the ts_reply and the eb' to the particular transaction node to cause the transaction node to timestamp the transaction with ts_reply, and to wait for a duration of eb' before requesting any further timestamp.

In various examples of the preceding embodiment, the GTS receives the command to switch from operating under the first mode to operating under a transition mode from a controller (also referred to as a controller). The GTS receives from the controller a request for a largest error bound value (Max_eb) between eb and the previous_ebs received at the GTS. The GTS then provides the Max_eb to the controller. The controller is configured to wait for a time interval equal to at least the Max_eb before instructing the transaction nodes to operate under the second mode.

In various examples of the preceding embodiment, the GTS receives a command to operate under the first mode. When operating under the first mode, the GTS periodically receives, from the GCSs, upper bound timestamp values. The GTS is configured to issue, upon request from a transaction node operating under the first mode, a transaction identification number greater than any of the upper timestamp values.

In various examples of the preceding embodiments, the pre-determined increment value is equal to 1.

In various examples of the preceding embodiments, the GTS is configured to reset Max_eb to zero after providing Max_eb to the controller.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present disclosure provides systems and methods that enable OLTP transaction nodes operating under GTM to transition to GCM management, or vice versa, without having to bring down the distributed database that includes the OLTP transaction nodes, without stopping or aborting transaction processing, without blocking new transactions, and with little to no down time.

Figure 1:
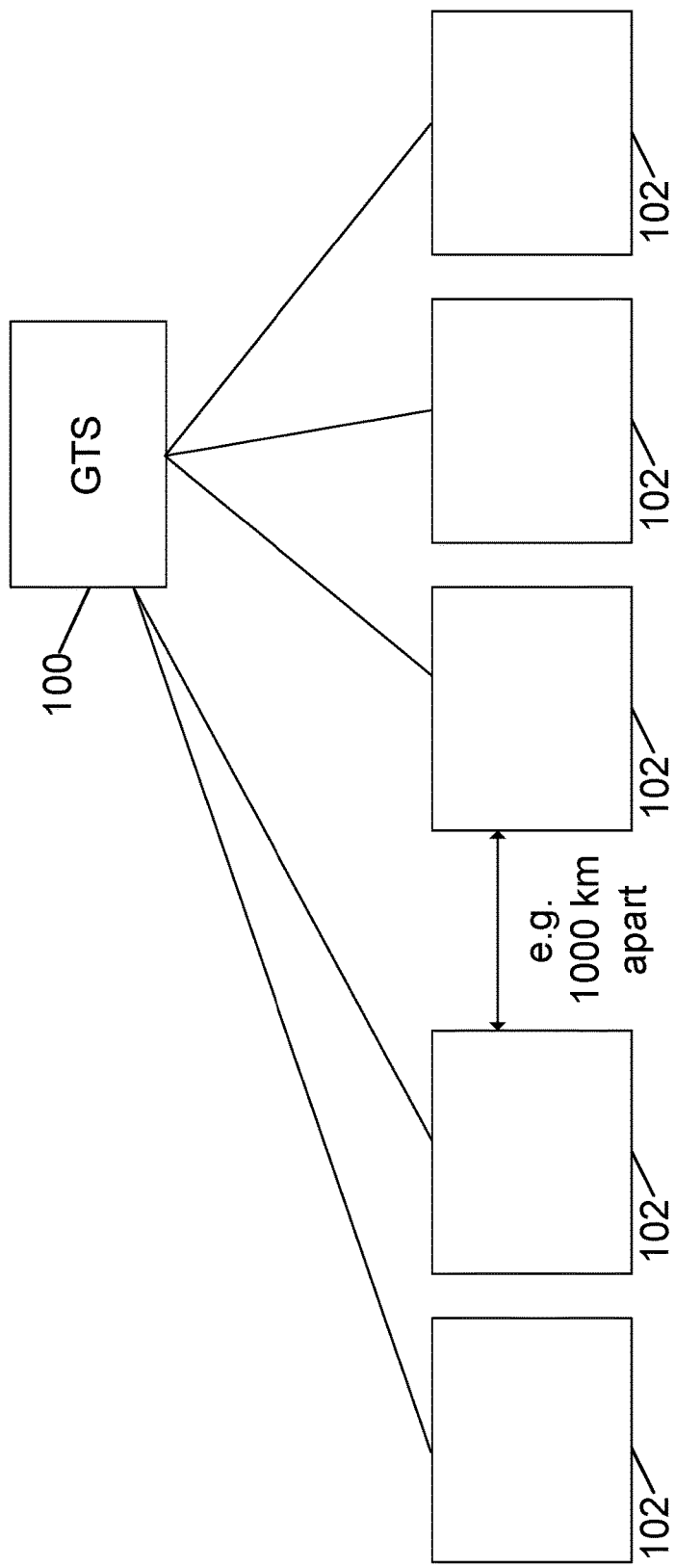
FIG. 1 shows a prior art global transaction system.

FIG. 1 illustrates a prior art GTM system that comprises a distributed database obtaining sequence-based identification (SBID) numbers from a GTS 100. The GTS 100 stamps transactions with respective SBID numbers on request from the transaction nodes 102 performing the transactions. Because the transaction nodes 102 may be spaced apart by thousands of kilometers and be at different distances from the GTS 100, the SBID numbers received at the transaction nodes may be skewed.

Figure 2:
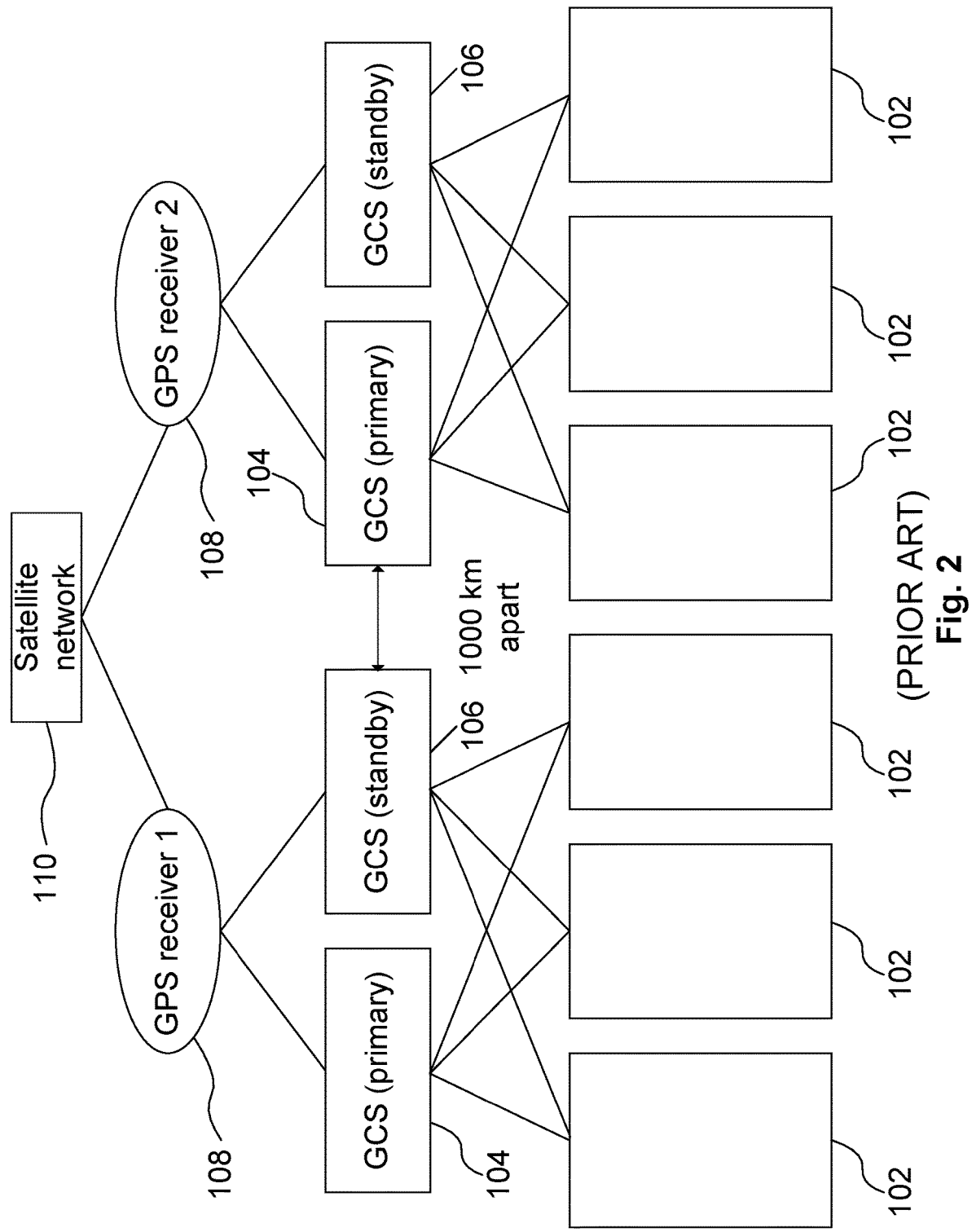
FIG. 2 shows a prior art global clock transaction system.

FIG. 2 illustrates a prior art GCM system that comprises a distributed database that may comprise transaction nodes 102 coupled to primary GCSs 104, standby GCSs 106, GPS receivers 108 and a satellite network 110. The transaction nodes 102 may each have an internal clock (not shown) used to timestamp transactions carried out at the transaction nodes 102. The internal clocks of the transaction nodes 102 may be periodically synchronized with the local GCSs 104, which may themselves be periodically synchronized with GPS receivers 108 that are connected to a GPS satellite network 110. In some instances, the GCSs 106 can be synchronized to a local atomic clock (not shown) instead of to the GPS satellite network. Standby GCSs 106 may be used upon failure of the primary GCSs 104.

Regardless of how precise GCM hardware is, there may be clock skew between different transaction nodes 102 and between GCSs 104. This may lead to problems that may be addressed with existing protocols, many of which involve waiting periods. An example of a basic protocol to address clock skew between different GCSs servers is as follows. For transactions occurring under GCM, the GCSs may be configured to provide beginning and ending timestamps with corresponding error bounds, which may be based on a measured time difference between a GCS local server clock and a reference clock, e.g., a GPS clock or an atomic clock. Any request for a subsequent timestamp, for a subsequent transaction, may be delayed by at least the error bound value of the prior timestamp. This may allow a sequence of GCM transactions to maintain consistency.

In contrast to the GCM transaction system of FIG. 2, because the GTM transaction system of FIG. 1 uses the same GTS to identify all transactions, there is no need for associating error bound waiting periods for GTM transactions.

Transitioning between GTM and GCM, and vice versa, seamlessly and without downtime may be difficult. Examples of reasons why there may be difficulties are described below.

To be compatible with both a GTS and GCSs, a distributed database using a parallel processing architecture would be able to switch (i.e., to transition) from GTM to GCM without system downtime. And in the event of GCM hardware failure, transactions may be able to transition back to obtaining SBID numbers from the GTS. In either case, one may want switching from GTM to GCM, or vice versa, to be quick, seamless and without system downtime. While switching is occurring, there should be no need to restart clusters of participating transaction nodes or to block new transactions. Also, it may be preferable for a transaction beginning under GTM to end under GTM before the system transitioning to GCM otherwise, this may cause the transaction to be aborted. To perform seamlessly, one may want a transaction initiated under GTM to receive an ending timestamp and be committed under GTM, so that a minimal number of transactions may be aborted.

One approach to allow compatibility between GTM and GCM would be to allow a transaction under one kind of time management (either GTM or GCM) to terminate before a subsequent transaction is initiated using the other kind (type) of time management (GCM or GTM). This may be done by introducing a waiting period between the end of a GTM or GCM initial transaction and the beginning of another transaction under GCM or GTM respectively. However, this may require that while transitioning from one to the other, and during the waiting period, that transactions be blocked, which may not be desired.

The timestamps in the GCM system may be expressed in any suitable time units. As a non-limiting example, a time interval may be expressed as the number of time units since a start time. The time units may be nanoseconds or any other suitable units.

The following provides details on incompatibility issues between GTM and GCM. At the outset, GTM and GCM are not immediately compatible because, among other reasons, the GTS typically issues SBID numbers one at a time and in sequence, while transaction nodes running under GCM clocks issue timestamps based on a running clock. That is, timestamps of subsequent transactions under GTM are increased by one but timestamps of subsequent transactions under GCM are increased by the amount of time between the subsequent transactions. Additional transaction compatibility issues that may occur are described below.

In the context of the present disclosure, whether transactions are identified by timestamps based on a running clock (e.g., GCM transactions) or by SBID numbers (e.g., GCM transactions) based on a series of numbers, both types of transactions can be said to be timestamped. That is, in the context of the present disclosure, a timestamp is a number that indicates when the timestamp was generated in relation to other timestamps.

Another compatibility issue is as follows. An initial GCM transaction begins at a transaction node where the transaction receives a beginning timestamp and an error bound the initial transaction is labeled GCM[trx1]. Upon GCM[trx1] ending, the transaction node timestamps the transaction with an ending timestamp and waits for a time duration equal to the error bound of the ending timestamp before requesting another timestamp. When a subsequent transaction is carried out, this one a GTM transaction (GTM[trx2]) that requires GCM[trx1] to be committed (to be made visible), a transaction node contacts the GTS to obtain a SBID and, upon completion, obtains an ending SBID. Because GCM[trx1] and GTM[trx2] use different transaction identification processes there may likely be an offset between the value of the ending timestamp of GCM[trx1] and the value of the beginning SBID of GCM[trx2]. As such, it may be possible for the beginning SBID of GTM[trx2] to be smaller than the ending timestamp value of GCM[trx1], even though GCM[trx1] ended before the transaction GTM[trx2] began. Because the beginning SBID of GTM[trx2] has a value that is less than the ending timestamp value of GCM[trx1], GCM[trx1] is not readable by GTM[trx2] and GTM[trx2] may not be completed.

To avoid this compatibility issue, each GCSs of a GCM system may be configured to periodically set the value of the greatest timestamp it will assign to forthcoming transactions. This value may be called the upper timestamp and be labelled as Upper_ts. The value of Upper_ts may be updated periodically or when an update condition is met. Is some embodiments of the present disclosure, Upper_ts may be obtained by the GTS of a GTM system that is set to take over transactions from the GCM system in case of failure of the GCM system. The GTS may be configured to not provide any SBID that has a value less than the value of Upper_ts. Stated otherwise, the GTS may be configured to provide transaction SBIDs that are equal or larger than the value of Upper_ts. The updating of Upper_ts may be run as a thread, referred herein as a "GTM_Update" thread that provides Upper_ts values to the GTS. The updates may occur at every 10 seconds, or at any other suitable time interval (e.g., 3 seconds, 12 seconds, etc.) Accordingly, in this embodiment, if the GCM system crashes and transactions are switched over to the GTM system, the transaction SBID issued by the GTS may be larger than any of the timestamps issued by the GCM system prior to the crash. Therefore, the transactions carried out under the GCM system may all be visible to the GTM system.

However, the updating of Upper_ts described above may lead to another compatibility issue when wanting transactions running under GTM to be switched to GCM. In this scenario, an initial GTM transaction GTM[trx1] may obtain a beginning SBID and an ending SBID from the GTS. Subsequently, when a second transaction occurs, this one under GCM and identified as GCM[trx2], the transaction obtains a beginning timestamp and an ending timestamp from its internal clock which may be synchronized to a GCS. Assuming the GTS has previously obtained an Upper_ts value from a GCS, the ending SBID of GTM[trx1] will have a value larger than the Upper_ts value. Regardless of the ending SBID of GTM[trx1], the beginning timestamp value of GCM[trx2] could be less than the Upper_ts value. In other words, there is no guarantee that the beginning timestamp of GCM[trx2] will be larger than the ending SBID of GTM [trx1] and, consequently, GTM[trx1] may not be visible by GCM[trx2].

The above-mentioned compatibility issues may be addressed by embodiments described below.

Figure 3:
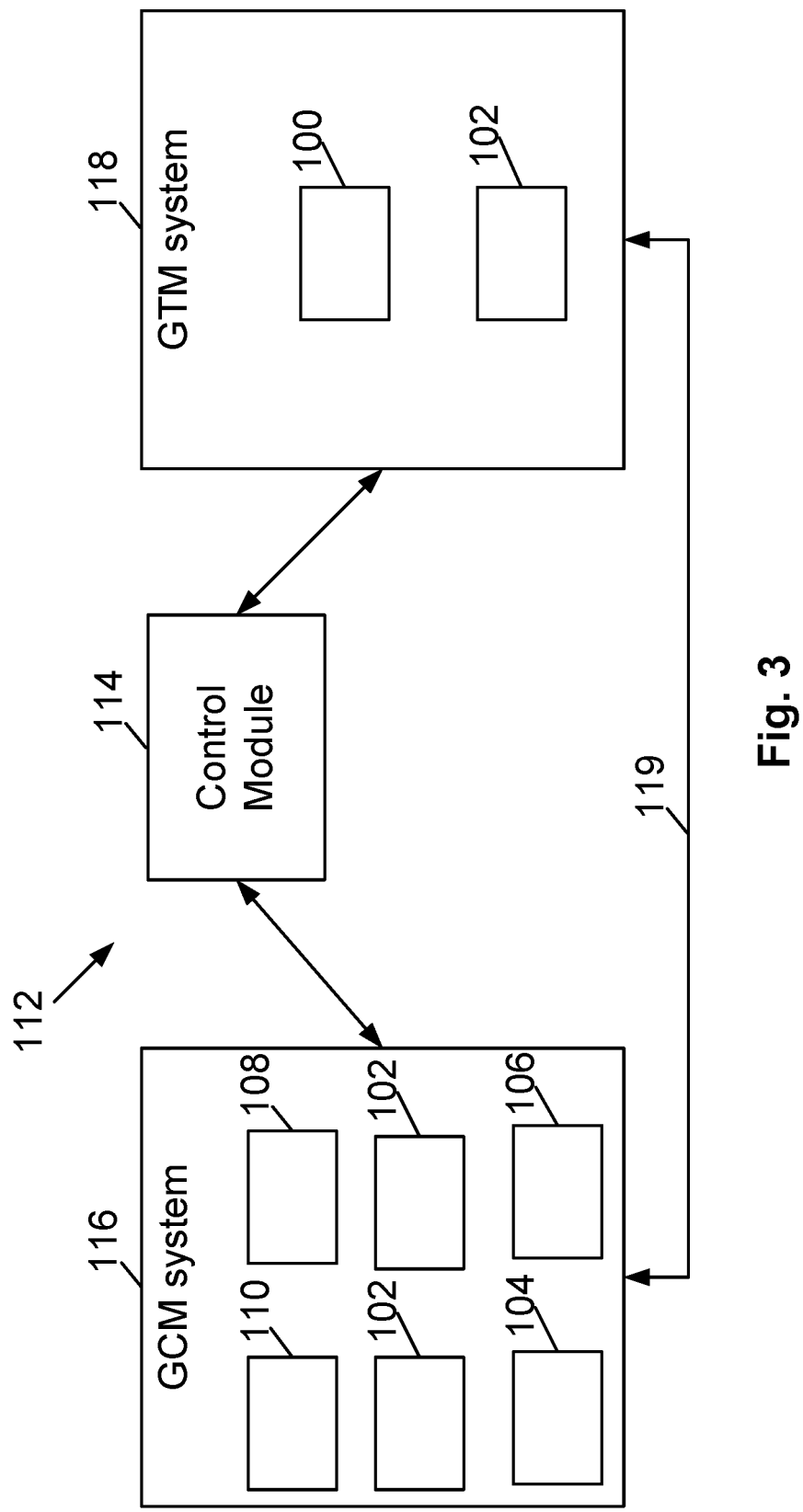
FIG. 3 shows a block diagram of an embodiment of a system in accordance with the present disclosure.

FIG. 3 shows a block diagram of a non-limiting embodiment of an OLTP system 112 in accordance with the present disclosure. The OLTP system 112 may include a control module (controller) 114, a GCM system 116 and a GTM system 118. The GCM system 116 of FIG. 3 may comprises a satellite network 110, GPS receivers 108, a primary GCS 104 and a standby GCS 106 and transactions nodes 102 such as shown in the prior art embodiment of FIG. 2. The GTM system 118 may include a GTS 100 and transaction nodes 102 such as those shown in the prior art embodiment of FIG. 1. Both the GCM system 116 and the GTM system 118 may be coupled to the control module 114 and may be couple to each other through the control module 114. Additionally, the GCM system 116 and the GTM system 118 may be coupled to each other directly as shown by the connection 119.

FIG. 3 shows the transaction nodes 102 as being part of the GCM system 116 and of the GTM system 118. This may be interpreted as meaning the same transactions nodes 102 may operate under the GCM system 116 or under the GTM system 118. And, as described below, the transactions node 102 may operate under the GCM mode, the GTM mode or a transition mode (dual management (DM) mode).

In a non-limiting embodiment of the present disclosure, the control module 114 may be configured to obtain a signal indicating that the GCM transactions are to be switched (transitioned) to GTM transactions or vice versa. The signal may be obtained when a switch condition is met. Such switch conditions may include, for transitioning between GCM transactions to GTM transactions: reaching a predetermined time for upgrading or maintaining the GCM system 116, a failure of the GCM local servers 104 such as, for example, the Upper_ts value not being able to be sent to the GTS 100, a timestamp error bound becoming larger than what may be tolerated by a customer (e.g., 500 ms), etc. When transitioning from GTM to GCM, the signal to transition may be based on reacing a pre-determined time for upgrading or maintaining the GTM system 118, a failure of the GTS 100, a need for better performance (at higher cost), etc. The control module 114 may receive a command to switch from GCM to GTM (or vice versa) from the GCM system 116 or from the GTM system 118. In other embodiments, the control module 114 may be pre-programed to switch at a pre-determined time. In yet other embodiments, the control module 114 may receive an instruction to switch, from any other authorized module or element of the OLTP system 112.

The following describes a non-limiting embodiment of the present disclosure where transactions running under GCM (under a GCM mode) transitioned to being run under GTM (under a GTM mode). In this embodiment, when the control module 114 determines that a switch condition has been met for transactions running under GCM to be switched to GTM, the control module 114 may instruct the transactions nodes 102 and the GTS 100 to operate under a new transaction management mode, labelled here as a dual management (DM) mode. The DM mode can also be referred to as the transition mode.

When operating in the DM mode, any transaction initiated after the transaction nodes 102 and the GTS 100 begin operating in the DM mode, may receive a timestamp and a corresponding error bound from the transaction node 102 that initiated the transaction. The timestamp and the error bound may be based on GCM local server 104 to which a clock of the transaction node 102 is synchronized. However, under the DM mode, the timestamp and the error bound may be modified to ensure any future timestamp issued by the GTS has a beginning timestamp value that is later than any of the ending timestamps issued for transactions initiated as GCM transactions or for transactions initiated after the beginning of the DM mode.

In the present embodiment, prior to the switch condition being met for transactions running under GCM to be switched to GTM, the above-mentioned GTM_Update thread may be running and may provided Upper_ts values to the GTS 100. When the switch condition is met, for example when the GCM system crashes, there may no longer by any need to keep running the GTM_Update thread. That is, at that point, the GTM_Update thread may have fulfilled its goal of keeping the GTS updated in case the transactions running under the GCM mode need to transition being run under the GTM mode. The control module 114 may then signal the GTS 100 to stop updating the current Upper_ts value.

The GTS 100 may obtain ts and eb from the related transaction node 102. As the GTS 100 obtains ts and eb values from the transaction nodes 102 operating under the DM mode, the GTS 100 may the timestamps and the error bounds obtained to a timestamp set {ts} and to an error bound set {eb} respectively.

For each timestamp obtained at the GTS 100 from the transaction nodes 102 operating in the DM mode, the GTS 100 may be configured to determine the largest ts thus far present in {ts}, i.e., the maximum timestamp provided thus far by all participating transaction nodes 102. The maximum timestamp may be labelled Max_ts and may be expressed as shown here:

$$\text{Max\_ts} = \max(\{ts\}) \quad \text{equation (1)}.$$

In the present embodiment, the GTS 100 may also be configured to determine the largest error bound thus far present in {eb}. The maximum error bound may be labelled Max_eb and may be expressed as shown here:

$$\text{Max\_eb} = \max(\{eb\}) \quad \text{equation (2)}.$$

The GTS 100 may also be configured to determine and provide, to the respective transaction node, a timestamp value ts_reply, defined as the maximum value between Max_ts and GTM_ts+$\Delta$, where GTM_ts is the value of the latest timestamp issued by the GTS 100 and $\Delta$ indicates the GTM timestamp increment, which may be equal to 1 or to any other suitable value larger than one. ts_reply may be expressed as follows:

$$ts\_reply = \max(\text{Max\_ts}, \text{GTM\_ts}+\Delta) \quad \text{equation (3)}.$$

The GTS 100 may update its own timestamp value GTM_ts to be equal to ts_reply. That is, $$\text{GTM\_ts} = ts\_reply = \max(\text{Max\_ts}, \text{GTM\_ts}+\Delta) \quad \text{equation (4)}.$$

The next timestamp to be issued by the GTS may have a value of ts_reply+$\Delta$.

After receiving ts_reply, the transaction node 102 may determines a waiting time correction delta_ts, expressed as:

$$delta\_ts = ts\_reply - ts \quad \text{equation (5)}$$

which may be greater than or equal to zero (delta_ts$\geq$0).

The transaction node 102 may timestamp the transaction with ts_reply but may wait an amount of time eb', which is defined as the sum of the original error bound eb and delta_ts, prior to committing the transaction timestamped with ts_reply, or prior to requesting a further modified timestamp:

$$eb' = eb + delta\_ts \quad \text{equation (6)}$$

$$eb' = eb + (ts\_reply - ts) \quad \text{equation (7)}.$$

This may ensure that any timestamp issued by the GTS 100 will not be earlier than the latest timestamp issued by a GCS 106. While switching a distributed database management from GCM to GTM, each new transaction may run under the DM mode until all the transaction nodes operate under the DM mode.

Figure 4:
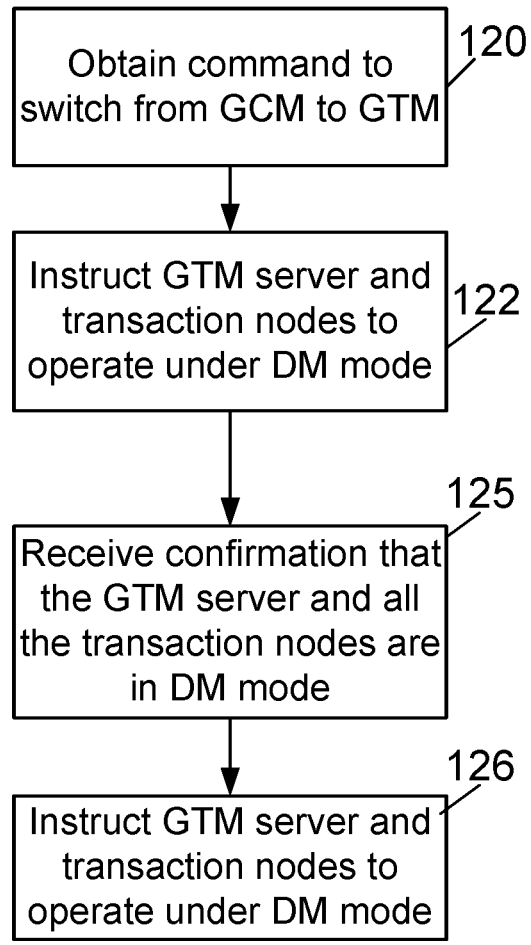
FIG. 4 shows a flowchart of a method in accordance with an embodiment of the present disclosure.

FIG. 4 is a flowchart of a method in accordance with an embodiment of the present disclosure when transitioning from processing transactions under the GCM mode to processing the transactions under the GTM mode. The actions of the method of FIG. 4 may be those performed by a control module (e.g., the control module 114 of FIG. 3).

At 120, the control module may obtain a command to switch from the GCM mode to the GTM mode. Subsequently, the control module may send, at 122, to the transaction nodes (e.g. the transaction nodes 102 of FIG. 3) running under the GCM mode and to the GTS (e.g., the GTS 100 of FIG. 3), a signal to operate under the DM mode for new transactions. Here, "new transaction" means a transaction initiated at a transaction node after the transaction node has switched to operating under the DM mode. This means that the transaction nodes thus far running under the GCM mode and the GTS may now operate, for new transactions, under the DM mode, where timestamps and error bounds obtained at transaction nodes are subsequently modified by the GTS in accordance with values determined by the GTS.

Subsequently, at 125, the control module may confirmation that the GTS and all the transactions nodes are in the DM mode. The confirmation occur on an element-by-element basis (element=individual transaction nodes or the GTS). When in the DM mode, the GTS may provide ts_reply and eb' to the transaction node in question, where ts_reply and eb' are defined above in accordance with equation (3) and equation (7).

At 126, after the control module has received confirmation that the GTS and the transaction nodes are in the DM mode, the control module may instruct the GTM sever and the transaction nodes to run under the GTM mode. From that point, any new transaction is processed as a GTM transaction.

Figure 5:
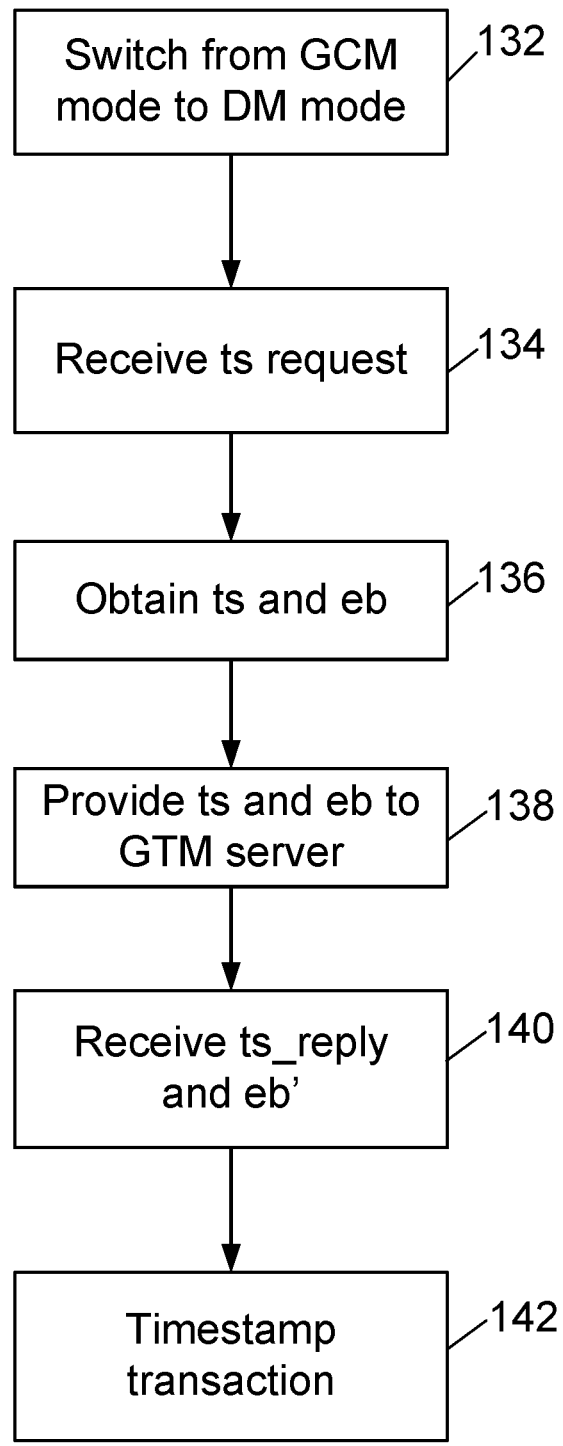
FIG. 5 shows a flowchart of a method in accordance with another embodiment of the present disclosure.

FIG. 5 shows a flowchart of an embodiment of a method in accordance with the present disclosure. The actions of the method of FIG. 5 are those performed by a transaction node. At 132, the transaction node may switch from running under the GCM mode to running under the DM mode. At 134, the transaction node may receive a ts request and in response to the request, may obtain, at 136, a timestamp ts and a timestamp error bound eb. At 138, the transaction node may provide ts and eb to a GTS that operates in the DM mode. In return, the transaction node may receive, at 140, ts_reply and eb', which are defined in the description above. That is, ts_reply=max(Max_ts, GTM_ts+1) and eb'=eb+(ts_reply−ts).

At 142, when the timestamp is an ending timestamp, the transaction node may timestamp the transaction with ts_reply but may wait for a time eb' before committing the transaction. When the timestamp is a beginning timestamp, the transaction node may timestamp the transaction with ts_reply but may wait for a time eb' before issuing another timestamp.

Figure 6:
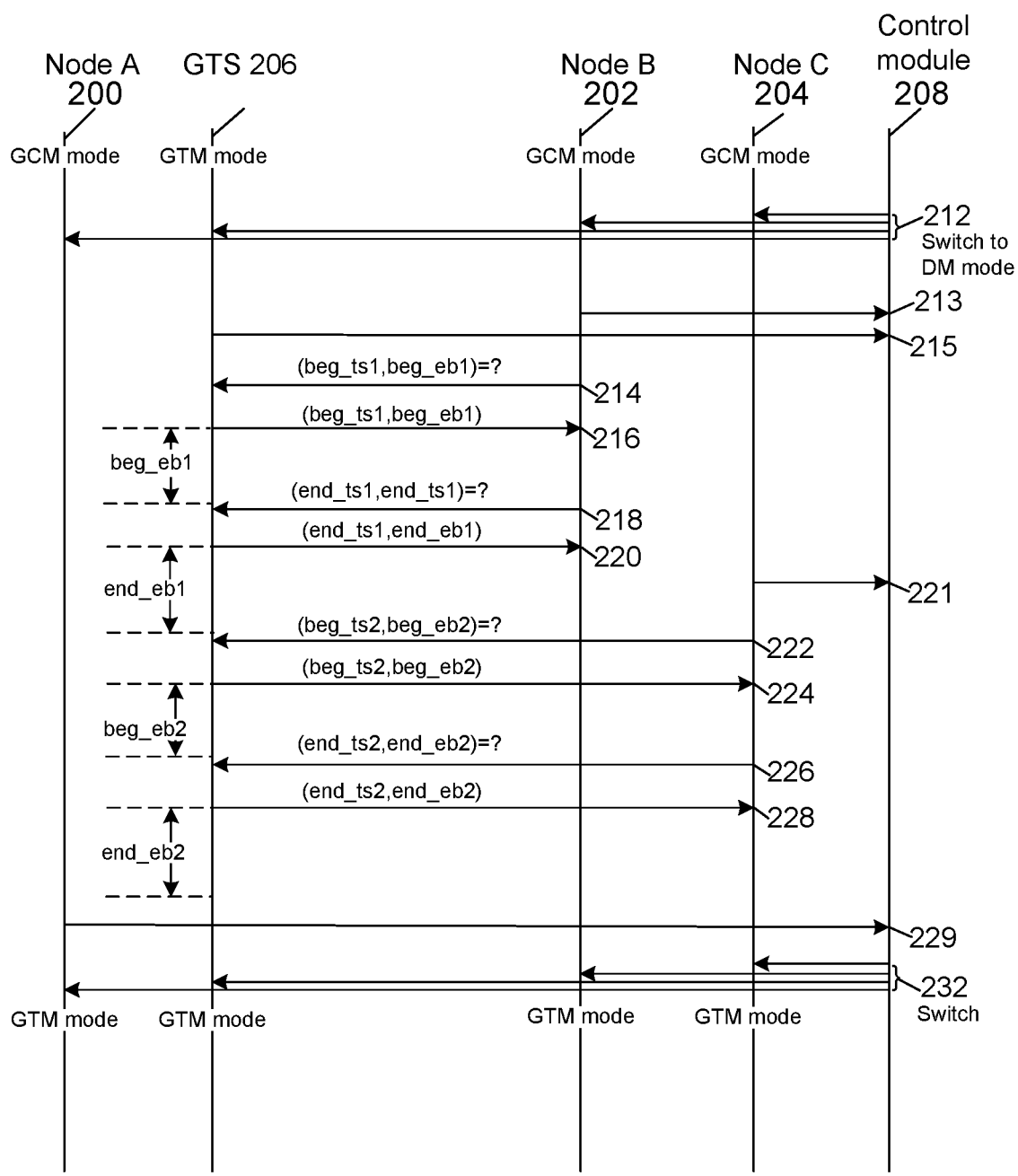
FIG. 6 shows a flow diagram in accordance with an embodiment of the present disclosure.

In accordance with a non-limiting embodiment of the present disclosure, FIG. 6 shows a flow diagram of requests and data passing between network elements of a distributed network configured for OLTP transactions, when transitioning from the GCM mode to the GTM mode. The network elements may include a transaction node A 200, a transaction node B 202, a transaction node C 204, a GTS 206 and a control module 208. In the present embodiment, only the transaction node A 200, the transaction node B 202 and the transaction node C 204 participate in OLTP transactions and form a cluster of transaction nodes.

At 212, the control module 208 may instruct the transaction node A 200, the transaction node B 202, the transaction C 204 and the GTS 206 to switch to the DM mode.

At 213, the control module 208 may receive confirmation from the transaction node B 202 that the transaction node B 202 is in the DM mode. And at 215, the control module 208 may receive confirmation from the GTS 206 that the GTS is in the DM mode.

At 214, the transaction node B 202, now in DM mode, may generate (may obtain) a beginning timestamp begin-ts1 and a beginning timestamp error bound begin-eb1 in accordance with the internal clock of the transaction node B 202, and may provide begin-ts1 and begin-eb1 in a request ((beg_ts1,beg_eb1)=?) to the GTS 206, which may now operate under GTM mode. The GTS 206 may modify begin-ts1 and begin-eb1 to obtain beg_ts1 and beg_eb1, which may be determined in accordance with equation (3) and equation (7) respectively. At 216, the transaction node B 202 may obtain the modified beginning timestamp (beg_ts1) and the modified error bound (beg_eb1) from the GTS 206. After obtaining beg_ts1 and beg_eb1, the transaction node B 202 may timestamp the first transaction with beg_ts1 but waits for a time beg_eb1 before requesting any further timestamp. This may avoid a later timestamp obtaining a timestamp value smaller than that of a preceding timestamp.

At 218, the transaction node B 202 may generate (may obtain) an ending timestamp ending-ts1 and an ending timestamp error bound ending-eb1 in accordance with the internal clock of the transaction node B 202, and may provide ending-ts1 and ending-eb1 in a request ((end_ts1, end_eb1)=?) to the GTS 206, which may operate under the GTM mode. The GTS 206 may modify the ending-ts1 and ending-eb1 to obtain end_ts1 and beg_eb1, which may be determined in accordance with equation (3) and equation (7) respectively. At 220, the transaction node B 202 may obtain the modified ending timestamp end_ts1 and the modified error bound end_eb1. Subsequent obtaining end_ts1 and end_eb1, the transaction node B 202 may timestamp the first transaction with end_ts1 but waits for a time end_eb1 before committing the transaction. Additionally, the GTS 206 may wait for a time end_eb1 before issuing any further timestamp. This may avoid a later timestamp having a timestamp value smaller than that of a preceding timestamp.

At 221, the control module 208 may obtain confirmation from the transaction node C 204 that the transaction node C in in the DM mode. The confirmation 221 may be obtained at any time after 212 and does not need to be obtained in relation to transactions occurring at the other transaction nodes.

Subsequently, at 222, the transaction node C 204, now in DM mode, may generate (may obtain) a beginning timestamp begin-ts2 and a beginning timestamp error bound begin-eb2 in accordance with the internal clock of the transaction node C 204, and may begin-ts2 and begin-eb2 in a request ((beg_ts2,beg_eb2)=?) to the GTS 206, which may now operate under the GTM mode. The GTS 206 may modify begin-ts2 and begin-eb2 to obtain beg_ts2 and beg_eb2, which may be determined in accordance with equation (3) and equation (7) respectively. At 224, the transaction node C 204 may the modified beginning timestamp (beg_ts2) and the modified error bound (beg_eb2) from the GTS 206. After obtaining beg_ts2 and beg_eb2, the transaction node C 204 may timestamp the second transaction with beg_ts2 but may wait for a time beg_eb2 before requesting any further timestamp. This may avoid a later timestamp obtaining a timestamp value smaller than that of a preceding timestamp.

At 226, the transaction node C 204 may generate (may obtain) an ending timestamp ending-ts2 and an ending timestamp error bound ending-eb2 in accordance with the internal clock of the transaction node C 204, and may provide ending-ts2 and ending-eb2 in a request ((end_ts2, end_eb2)=?) to the GTS 206, which may operate under the GTM mode. The GTS 206 may modify ending-ts2 and ending-eb2 to obtain end_ts2 and beg_eb2, which may be determined in accordance with equation (3) and equation (7) respectively. At 228, the transaction node C 204 may obtain the modified ending timestamp end_ts2 and the modified error bound end_eb2. Subsequent to obtaining end_ts2 and end_eb2, the transaction node C 204 may timestamp the second transaction with end_ts2 but may wait for a time end_eb2 before committing the transaction. Additionally, the GTS 206 may wait for a time end_eb2 before issuing any further timestamp. This may avoid a later timestamp having a timestamp value smaller than that of a preceding timestamp.

At 229, the control module 208 may obtain confirmation from the transaction node A 200 that the transaction node A 200 is in the DM mode. However, in the present example, the transaction node does not request a modified timestamp or a modified error bound. Subsequently, at 232, because the control module 208 has obtained confirmation from all the transactions nodes and from the GTS 206 that they are in DM mode, the control module 208 may instruct, at 232, the control node A 200, the control node B 202, the control node C 204 and the GTS 206 to treat all new timestamp requests under the GTM mode. This means that any pending transaction running under the DM mode will complete under the DM mode but that all transactions initiated after 232 will be run under the GTM mode.

Transitioning from the GTM mode to GCM mode is like transitioning from the GCM mode to the GTM mode in that some transactions may be running under the DM mode. During such a transition, a distributed database may run and be kept online throughout the transition, and transactions under the DM mode may be used to prevent transactions under the GTM mode and under the GCM mode from running at the same time. During a transition period, transactions under the GTM mode and under GCM mode may not affect each other.

Figure 7:
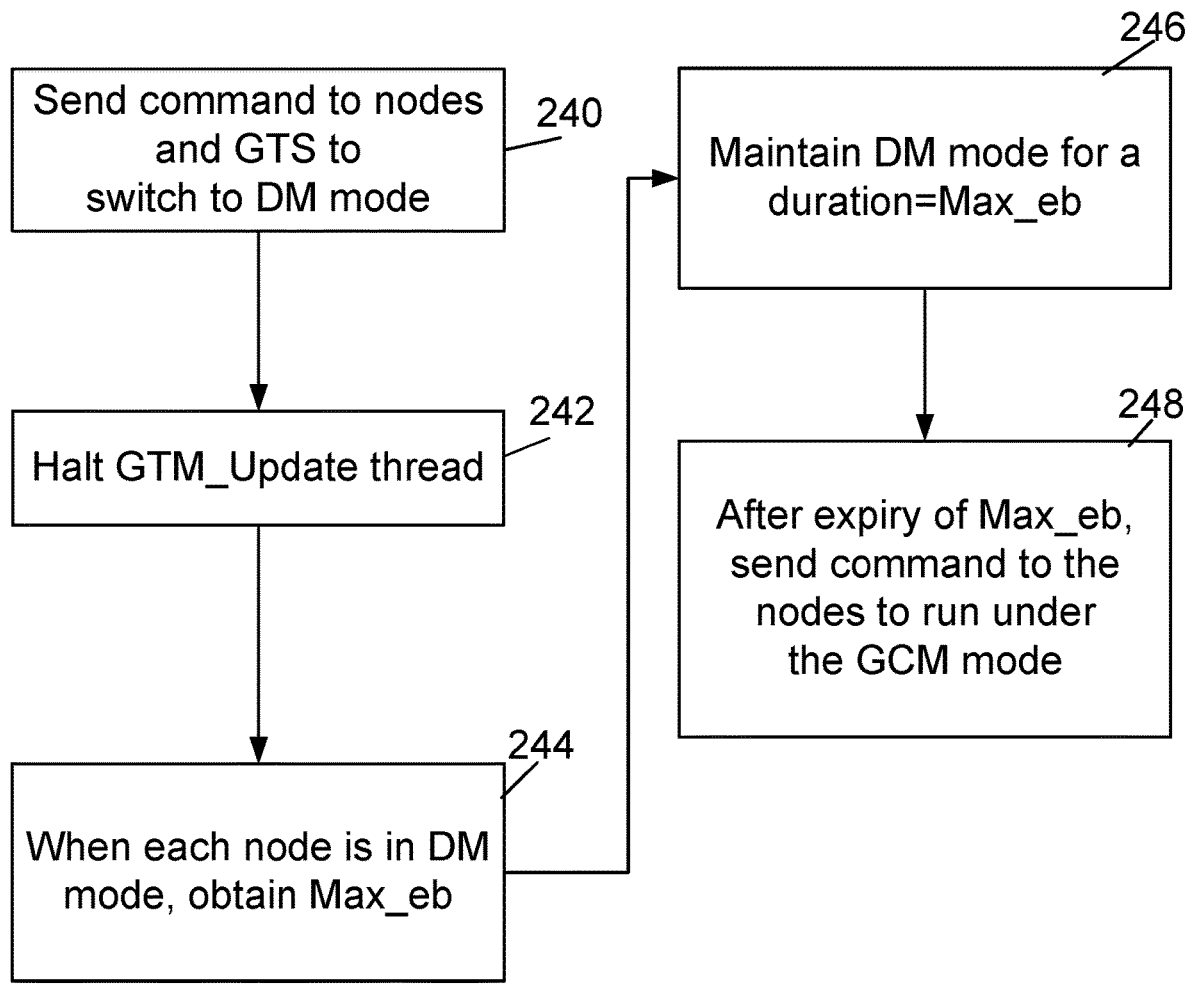
FIG. 7 shows a flowchart of a method in accordance with yet another embodiment of the present disclosure.

FIG. 7 is a flowchart of a method in accordance with the present disclosure. The flowchart of FIG. 7 illustrates actions that may performed by a control module in relation to transitioning from transactions being processed under the GTM mode to transactions being processed under the GCM mode.

At 240, the control module may send a signal to the transaction nodes and to the GTS signaling that new transactions may be managed under the DM mode. Any transaction node in the DM mode may proceed with requesting modified timestamps and modified error bounds from the GTS running in the DM mode.

At 242, if there is a background synchronization thread running (e.g., the GTM_Update thread) to periodically set an upper timestamp value Upper_ts and to provide the GTS with Upper_ts values, the control module may stop the thread or may instruct the GTS to stop updating the Upper_ts value.

At 244, when the control module obtains confirmation that each transaction node is in DM mode, the control module may determine the largest error bound Max_eb of all previously received error bounds. At 246, the control module may wait for a duration equal to Max_eb and then, at 248, may send a command to the transaction nodes to operate under the GCM mode.

By waiting for a duration of Max_eb, the control module may ensure that any transaction initiated under the GCM mode, after the expiry of Max_eb, will have a timestamp larger than the previous transactions committed under the GTM mode or under the DM mode. The control module may also reset the Max_eb at the GTS to zero after action 248. Resetting Max_eb to zero prepares the control module for a subsequent transition between operation modes.

Figure 8:
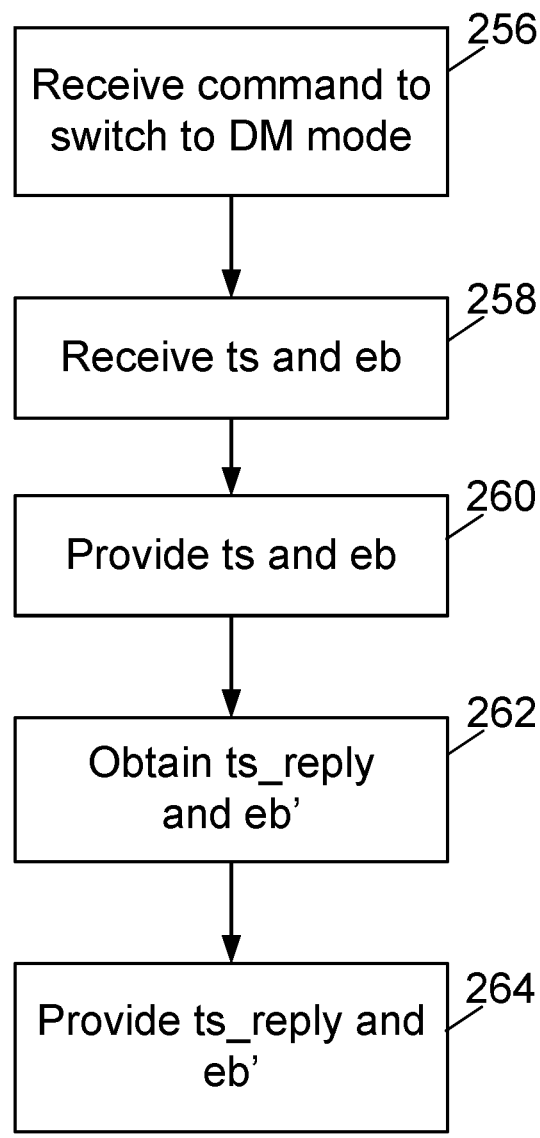
FIG. 8 shows a flowchart of a method in accordance with a further embodiment of the present disclosure.

In accordance with an embodiment of the present disclosure, FIG. 8 shows actions performed by a transaction node transitioning from being operated under the GTM mode to being operated under the GCM mode after the control module has sent a command to the GTS and to the transaction nodes to transition from the GCM mode to the GTM mode, and before the transaction module determines that all the transaction nodes are in the DM mode.

At action 256, the transaction node may receive a command to operate under the DM mode. At 258, a transaction is initiated at the transaction node, which may obtain a timestamp ts and a timestamp error bound eb from its internal clock. At 260, the transaction node may provide ts and eb to a GTS operating under the DM mode. Subsequently, at 262, the transaction node may receive ts_reply and eb' from the GTS. At 264, the transaction node may timestamp the transaction with ts_reply but may wait for a time eb' before committing the transaction. ts_reply and eb' may be determined in accordance with equation (3) and equation (7) respectively.

Referring back to FIG. 7, the point in the method where all the nodes are in DM mode can be thought of as a first synchronization point in the method. The point in the method that follows the transaction nodes being kept in DM mode for a duration of Max_eb can thought of as a second synchronization point.

Figure 9:
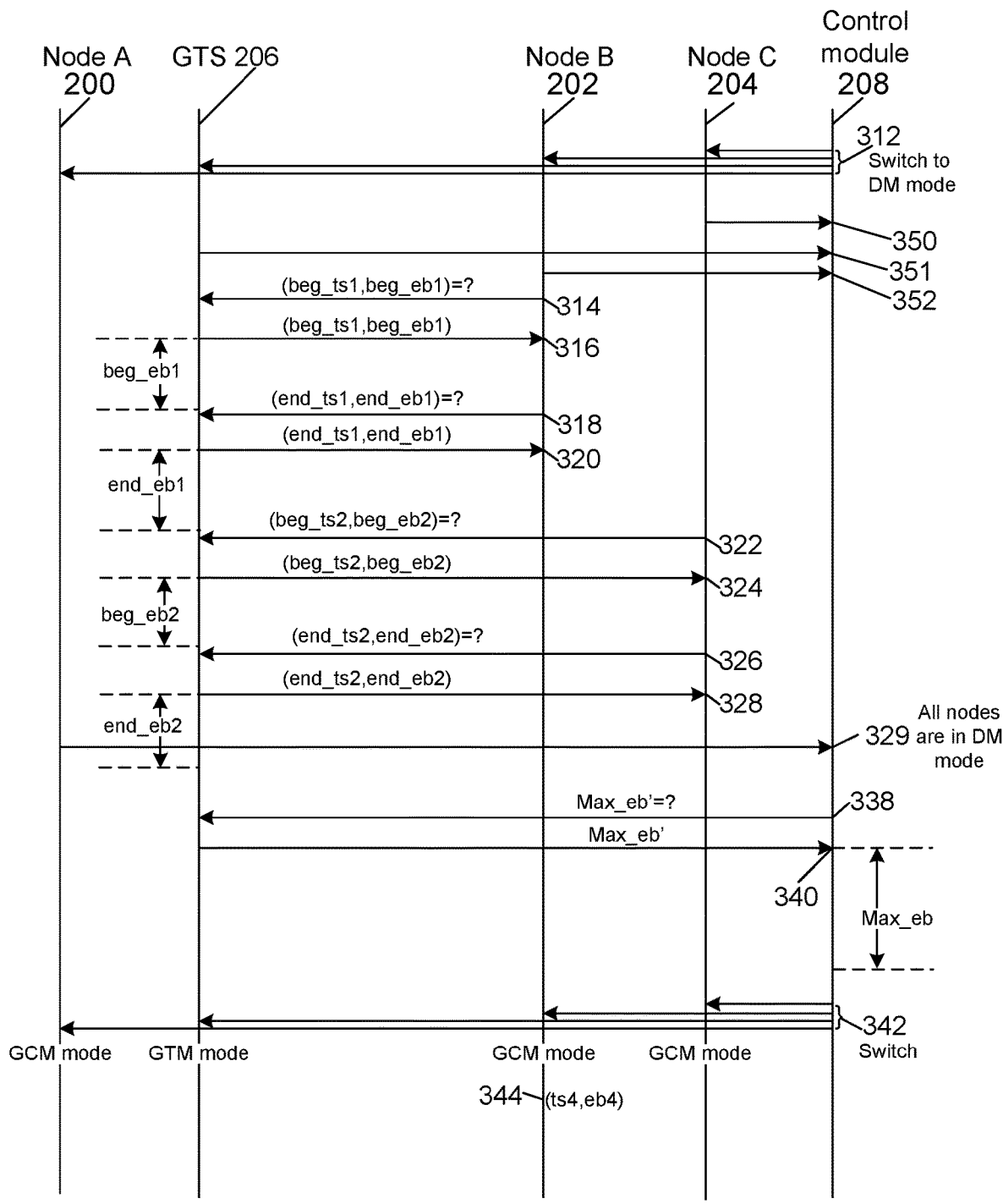
FIG. 9 shows a flow diagram in accordance with another embodiment of the present disclosure.

In accordance with a non-limiting embodiment of the present disclosure, FIG. 9 shows a flow diagram of requests and data passing between network elements of a distributed network configured for OLTP transactions. The network elements may include the transaction node A 200, the transaction node B 202, the transaction node C 204, the GTS 206 and the control module 208. In the present embodiment, only the transaction node A 200, the transaction node B 202 and transaction node C 204 may participate in OLTP transactions and form a cluster of transaction nodes.

As described below, after any of the transaction node A 200, the transaction node B 202 and the transaction node C 204 receives a beginning timestamp or an ending timestamp, the transaction node may timestamp the transaction but may wait for a time interval to pass prior to requesting a further timestamp or prior to committing the timestamp's associated transaction. This may avoid a later timestamp obtaining a timestamp value smaller than that of a preceding timestamp.

Prior to any request being issued by the control module 208, the transaction node A 200, the transaction node B 202, the transaction node C 204 and the GTS 206 may be in GTM mode. That is, any transaction occurring at the transaction node A 200 or the transaction node B 202 or the transaction node C 204 may obtain its timestamps (SBIDs) from the GTS 206, with the GTS 206 operating in the GTM mode.

In the embodiment shown at FIG. 9, at 312, the control module 208 may a command to the transaction node A 200, the transaction node B 202, the transaction node C 204 and to the GTS 206 to switch their operating mode to the DM mode. When this command is executed at the transaction node A 200, the transaction node B 202, the transaction node C 204 and the GTS 206, any new transaction may be processed under the DM mode.

At 350, the transaction node C 204 may confirm to the control module 208 that it is now operating under the DM mode. The transaction node B 202 may do the same at 352, and the GTS 206 may do the same at 351. The transaction node A may confirm to the control module 208 that is it now operating under the DM mode at action 329, which may confirm to the control module 208 that all the transactions nodes are operating under the DM mode.

At 314, the transaction node B 202 is operating under the DM mode and, after obtaining a beginning timestamp begin-ts1 and a timestamp error bound begin-eb1 from its internal clock, may provide begin-ts1 and begin-eb1 to the GTS 206 in a request for a modified timestamp (beg_ts1) and a modified error bound (beg_eb1). At 316, the transaction node B 202 may obtain the modified beginning timestamp (beg_ts1) and the modified beginning timestamp error bound (beg_eb1), which may be determined by the GTS 206 in accordance with equation (3) and equation (7) respectively. After obtaining beg_ts1 and beg_eb1, the transaction node B 202 may timestamp the first transaction with beg_ts1 but waits for a time beg_eb1 before updating the transaction database with ts_reply. This may avoid having a later timestamp obtaining a timestamp value smaller than that of a preceding timestamp.

At 318, after obtaining an ending timestamp ending-ts1 and a timestamp error bound ending-eb1 from its internal clock, the transaction node B 202 may provide ending-ts1 and ending-eb1 to the GTS 206 in a request for a modified timestamp (end_ts1) and a modified error bound (end_eb1). At 320, the transaction node B 202 may obtain the modified ending timestamp (end_ts1) and the modified error bound (end_eb1), which may be determined by the GTS 206 in accordance with equation (3) and equation (7) respectively. After obtaining end_ts1 and end_eb1, the transaction node B 202 may timestamp the first transaction with end_ts1 but waits for a time end_eb1 before committing the first transaction. Additionally, the GTS 206 may wait for a time end_eb1 before issuing any further timestamp.

At 322, the transaction node C 204 is operating under the DM mode and may begin a second transaction by obtaining, for the second transaction, a beginning timestamp begin-ts2 and a timestamp error bound begin-eb2 from its internal clock and provides begin-ts2 and begin-eb2 to the GTS 206 in a request for a modified timestamp (beg_ts2) and a modified error bound (beg_eb2). At 324, the transaction node C 204 may obtain the modified beginning timestamp (beg_ts2) and the modified error bound (beg_eb2), which may be determined by the GTS 206 in accordance with equation (3) and equation (7) respectively. After obtaining beg_ts1 and beg_eb1, the transaction node C 204 may timestamp the second transaction with beg_ts2 but waits for a time beg_eb2 before before updating the transaction database with ts_reply. Additionally, the GTS 206 may wait for a time beg_eb2 before issuing any further timestamp.

At 326, the transaction node C 204 may request a modified ending timestamp and a modified ending timestamp error bound for a second transaction by first obtaining an ending timestamp ending-ts2 and a timestamp error bound ending-eb2 from its internal clock and then providing ending-ts2 and ending-eb2 to the GTS 206 in a request for a modified timestamp (end_ts2) and a modified error bound (end_eb2). At 328, the transaction node C 204 may obtain the modified ending timestamp (end_ts2) and the modified error bound (end_eb2), which may be determined by the GTS 206 in accordance with equation (3) and equation (7) respectively. After obtaining end_ts2 and end_eb2, the transaction node C 204 may timestamp the second transaction with end_ts2 but waits for a time end_eb2 before committing the second transaction and before requesting any further timestamp.

Subsequently, the control module may obtain, at 329, confirmation from the transaction node A 202 that it is now operating under the DM mode. Prior to 329, any transaction conducted by the transaction node A 200 was conducted in the GTM mode. That is, a timestamp request for a GTM transaction could have occurred at the transaction node A 200 at any time between 312 and 329. For this transaction, the transaction timestamp obtained by the transaction node A 200 will have a timestamp value provided by GTS 206 and would take into account all the modified error bounds issued by the GTS 206 between 312 and the time at which the GTM transaction under transaction node A 200 occurs. If the timestamp in question is an ending timestamp, the GTM transaction under the transaction node A will be committed without any waiting period. If this GTM transaction is committed just before all the transaction nodes confirm being in the DM mode and the transaction nodes are immediately instructed to the GCM mode, then it is possible for a GCM transaction to have a timestamp value that is earlier than the timestamp value of the GTM transaction that occurred at the transaction node A 200.

At this point, in the present embodiment, when each of the transaction nodes has confirmed to the control module 208 that they have switched to the DM mode, the control module 208 may request, at 338, from the GTS 206, the maximum modified error bound issued, i.e., the maximum value between beg_eb1, end_eb1, beg_eb2, end_eb2, beg_eb3 and end_eb3. The control module 208 may obtain, at 340, the maximum error bound value (Max_eb) and may wait for a duration of Max_eb before instructing, at 342, the transaction node A 100, the transaction node B 102, and the transaction node C 104 to switch their operation from the DM mode to the GCM mode. The control module 208 may also instruct, at 342, the GTS 206 to switch from operating under the DM mode to operating under the GTM mode.

By waiting for a duration of Max_eb before issuing the switch request at 342, the control module 208 may ensure that any further timestamp will have a value larger than the latest previous timestamp, which, in the present embodiment, is end_ts2. For example, the transaction node B 202, which is now operating in GCM mode, may obtain, at 344, a beginning timestamp ts4 for a fourth transaction. ts4 is later than end_ts2.

Figure 10:
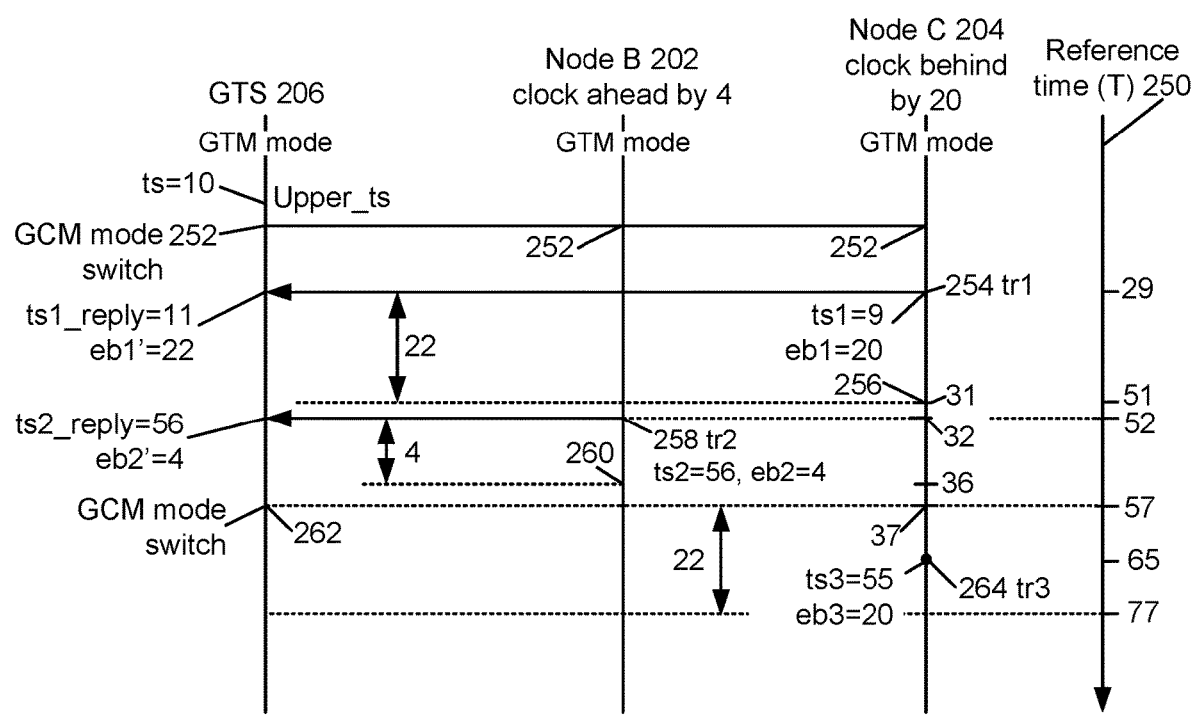
FIG. 10 shows a flow diagram in accordance with yet another embodiment of the present disclosure.

The opposite is illustrated in FIG. 10, where are shown the GTS 206, the transaction node B 202, the transaction node C 204 and a reference time 250. In the example of FIG. 10, the timestamps at the transaction node B 204 are ahead by 4 time units (T) and the timestamps at transaction node C 204 are behind by 20 T. Initially, the GTS 206, the transaction node B 202 and the transaction node C are in the GTM mode. At 252, the GTS 206, the transaction node B 202 and the transaction node C 204 have all transitioned to the DM mode. The value of Upper_ts currently is 10 T.

At 254, which is at 29 T according to the reference time 250, the transaction node C 204 provides to the GTS 206, for a first transaction (tr1), a timestamp (ts1) and the timestamp error bound (eb1). In this example, the clock at the transaction node C 204 is 20 T behind the reference time 250. As such, ts1=9 T and eb=20 T. The GTS 206 determines the largest value between 9 T and Upper_ts+1 time unit, which is equal to 11 T. The GTS 206 also determines the maximum error bound received thus far, which is 20 T. According to equation (3) and equation (7), ts1_reply=11 T and eb1'=22 T. The transaction node C 204 receives ts1_reply and eb1', timestamps tr1 with ts1_reply but waits for a time interval equal to eb' to commit, at 256, tr1.

Subsequently, at 258, which is at 50 T according to the reference time 250, the transaction node B 202 provides to the GTS 206, for a second transaction (tr2), a timestamp (ts2) and the error bound (eb2) of the timestamp. In this example, the clock at the transaction node C 202 is 4 T ahead of the reference time 250. As such, ts2=56 T and eb2=4 T. The GTS 206 determines the largest value between 54 T and Upper_ts+1 time unit, which is now equal to 12 T. The largest value is 56 T. The GTS 206 also determines the maximum error bound received thus far, which is 20 T. According to equation (3) and equation (7), ts2_reply=54 T and eb2'=4 T. The transaction node C 204 receives ts2_reply and eb2', timestamps tr2 with ts2_reply but waits for a time interval equal to eb2' to commit tr2, at 260, tr1.

At 262, which is at 57 T according to the reference time 250, the GTS 206, the transaction node B 202 and the transaction node C 204 have all transitioned to GCM mode. If, at this stage, the transaction node C 204 provides, at 264, a timestamp of 65 T according to the reference time 250, because the clock of the transaction node C is 20 T behind the reference time, the actual timestamp issued at 264 will have a value of 47 T, which is less than the ending timestamp ts2_reply=56 T. Consequently, the earlier transaction tr2 will not be visible to the transaction tr3. On the other hand, any transaction occurring after 20 T from when the GTS 206, the transaction node B 202 and the transaction node C 204 have transitioned to GCM mode will be able to see transaction tr2.

Figure 11:
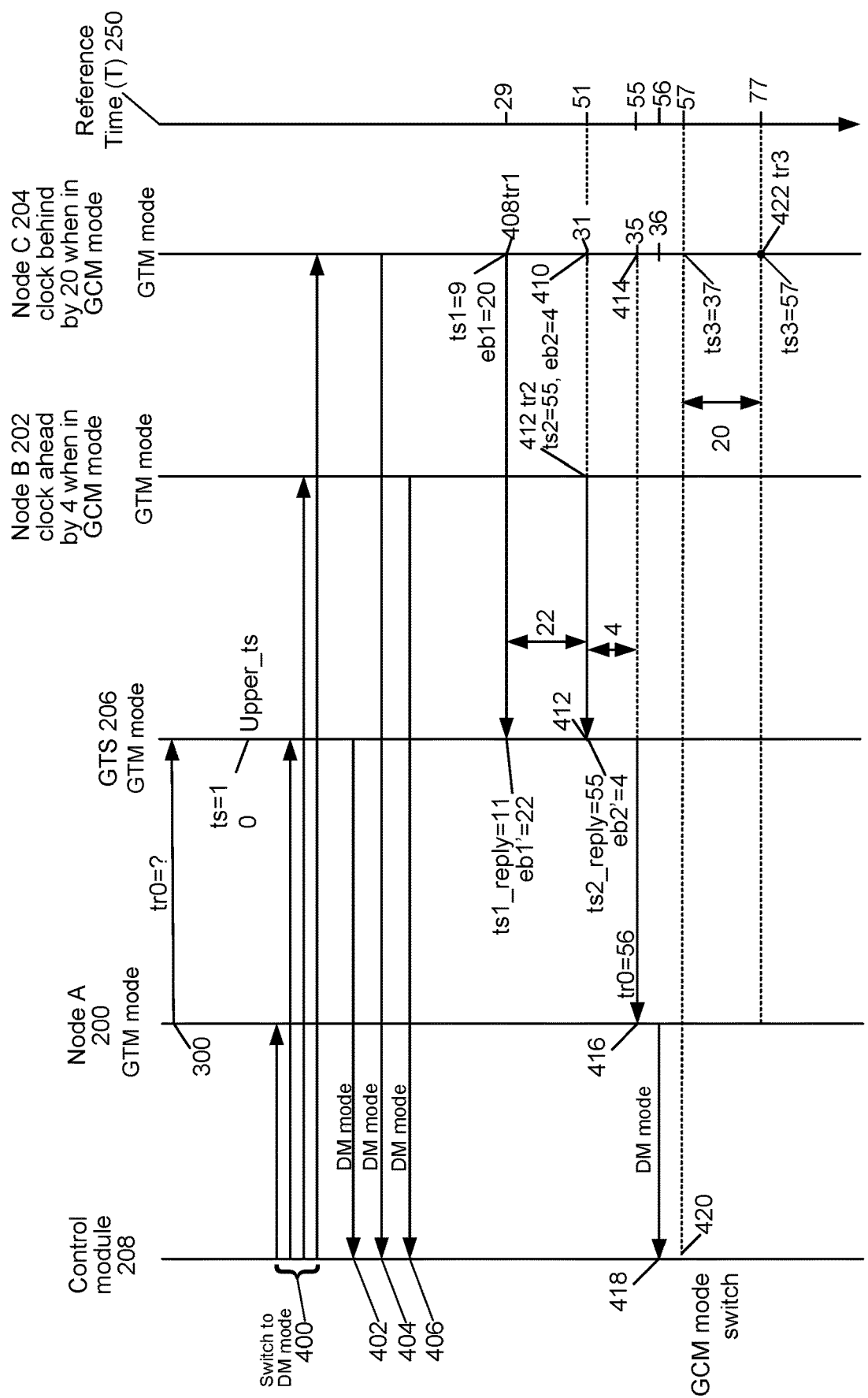
FIG. 11 shows a flow diagram in accordance with a further embodiment of the present disclosure.

FIG. 11 shows another example where the transaction node A 200 is shown in addition to all the elements shown in FIG. 10. In the example of FIG. 11, the transaction node A 200, while in the GTM mode, requests, at 300, for transaction zero (tr0) a timestamp from the GTS 206, which is also in the GTM mode at this stage. Before the GTS 206 replies to the request 300, the control module 208 instructs, at 400, all the transaction nodes and the GTS 206 to operate under the DM mode. In response, the control module 208 receives, at 402, confirmation from the GTS 206 that is operating in the DM mode. The transaction node C 204 does the same at 404, and the transaction node B 202 does the same at 406. At this stage, the transaction node A 200 is still operating under the GTM mode. Also at this stage, the Upper_ts is equal to 10 T.

At 408, which is at 29 T according to the reference time 250, the transaction node C 204 provides to the GTS 206, for a first transaction (tr1), a timestamp (ts1) and the timestamp error bound (eb1). In this example, the clock at the transaction node C 204 is 20 T behind the reference time 250. As such, ts1=9 T and eb=20 T. The GTS 206 determines the largest value between 9 T and Upper_ts+1 time unit, which is equal to 11 T. The GTS 206 also determines the maximum error bound received thus far, which is 20 T. According to equation (3) and equation (7), ts1_reply=11 T and eb1'=22 T. The transaction node C 204 receives ts1_reply and eb1', timestamps tr1 with ts1_reply but waits for a time interval equal to eb' to commit tr1 at 410.

At 412, which is at 51 T according to the reference time 250, the transaction node B 202 provides to the GTS 206, for a second transaction (tr2), a timestamp (ts2) and the error bound (eb2) of the timestamp. In this example, the clock at the transaction node C 202 is 4 T ahead of the reference time 250. As such, ts2=55 T and eb2=4 T. The GTS 206 determines the largest value between 55 T and Upper_ts+1 time unit, which is now equal to 12 T. The largest value is 55 T. The GTS 206 also determines the maximum error bound received thus far, which is 20 T. According to equation (3) and equation (7), ts2_reply=55 T and eb2'=4 T. The transaction node C 204 receives ts2_reply and eb2', timestamps tr2 with ts2_reply but waits for a time interval equal to eb2' to commit tr2 at 414.

At 416, the GTS 206 replies to the timestamp request received from the transaction node 200 at action 300. The reply is equal to the last timestamp issued by the GTS 206, which is 55 T, plus one time increment (1 T). The reply is thus 56 T, shown at 416. At 418, the control module 208 receives confirmation from the transaction node A 200 that it is now operating under the DM mode.

At 420, the control module instructs the transaction node A 200, the transaction node B 202 and the transaction node C 204 to operate under the GCM mode and instructs the GTS 206 to operate under the GTM mode (the GTM_Update thread is reactivated). The control module 208 provides, also at 420, the Max_eb value. The transaction node A 200, the transaction node B 202 and the transaction node C 204 are configured to wait for a time interval of Max_eb before issuing any new timestamp. By waiting for Max_eb, transaction zero will be visible by transaction three at 422.

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product or a computer program product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover all modifications, variations, combinations or equivalents that fall within the scope of the present invention.

What is claimed is:

1. A method for an online transaction system to transition from operating under a first mode where transactions nodes identify sequential transactions with sequential identification numbers obtained from a global transaction server (GTS) to a second mode where the transaction nodes identify consecutive transactions with timestamps based on global clock servers (GCSs) coupled to the transaction nodes, the method comprising:
    at a controller coupled to the transaction nodes and to the GTS:
        instructing the transaction nodes and the GTS to operate under a transition mode;
        obtaining confirmation that each transaction node is operating under the transition mode, each transaction node being configured to, when operating under the transition mode, provide to the GTS timestamps and timestamp error bounds based on the GCSs;
        after having obtained confirmation that each transaction node is operating under the transition mode, obtaining a largest error bound value (Max_eb) from all the error bounds received at the GTS; and
        instructing the transaction nodes to operate under the second mode but to wait for a duration equal to at least the Max_eb before issuing any timestamp under the second node.

2. The method of claim 1, further comprising, at the controller:
    instructing the GTS to operate under the first mode, wherein when operating under the first mode, the GTS is configured to periodically receive, from the GCSs, upper bound timestamp values, the GTS being configured to issue, upon request from a transaction node operating under the first mode, a transaction identification number greater than any of the upper timestamp values.

3. The method of claim 1, further comprising, at the controller:
instructing the GTS to reset Max_eb to zero after obtaining Max_eb from the GTS.

4. A method for an online transaction system to transition from operating under a first mode where a plurality of transactions nodes identify sequential transactions with sequential identification numbers obtained from a global transaction server (GTS) to a second mode where the plurality of transaction nodes identify consecutive transactions with timestamps based on global clock servers (GCSs) coupled to the transaction nodes, the method comprising:
at a transaction node of the plurality of transaction nodes:
receiving a command to operate under a transition mode;
when in the transition mode,
obtaining, for a transaction conducted at the transaction node, a timestamp (ts) and a timestamp error bound (eb), the ts and the eb being based on the GCSs;
providing ts and eb to the GTS operating under the transition mode;
receiving from the GTS a modified timestamp (ts_reply) and a modified error bound (eb');
timestamping the transaction with ts_reply; and
waiting for a time interval of eb' prior to providing any further timestamp and timestamp error bound to the GTS.

5. The method of claim 4, wherein receiving the command to operate under the transition mode includes receiving the command from a controller, the method further comprising, at the transaction node:
confirming to the controller that the transaction node is operating under the transition mode.

6. The method of claim 5, further comprising, obtaining from the controller, a command to operate under the second mode.

7. A method for an online transaction system to transition from operating under a first mode where transaction nodes identify consecutive transactions with timestamps based on global clock servers (GCSs) coupled to the transaction nodes, to operating under a second mode where the transactions nodes identify sequential transactions with sequential identification numbers obtained from a global transaction server (GTS), the method comprising:
at the GTS:
receiving a command to switch from operating under the first mode to operating under a transition mode;
when the GTS is operating under the transition mode:
for a transaction initiated after the GTS switched to operating under the transition mode:
receiving a transaction timestamp (ts) and an error bound (eb) of the timestamp from a transaction node, the ts and the eb being based on the GCSs, the GTS having associated thereto:
an identification number of a last transaction conducted by the GTS,
timestamps previously received (previous_tss) at the GTS, and
error bounds of the timestamps previously received (previous_ebs) at the GTS;
obtaining a modified timestamp (ts_reply) by determining a maximum value between the ts, the previous_tss, and the identification number of the last transaction incremented by a predetermined increment value;
determining a modified error bound (eb') by adding the eb to a difference between ts_reply and ts; and
providing the ts_reply and the eb' to the transaction node that provided the ts and the eb to the GTS to cause the transaction node to timestamp the transaction with ts_reply, and to wait for a duration of eb' before requesting any further timestamp.

8. A method for an online transaction system to transition from operating under a first mode where transaction nodes identify consecutive transactions with timestamps based on global clock servers (GCSs) coupled to the transaction nodes, to operating under a second mode where the transactions nodes identify sequential transactions with sequential identification numbers obtained from a global transaction server (GTS), the method comprising:
at a controller coupled to the transaction nodes and to the GTS:
instructing the transaction nodes and the GTS to operate under a transition mode; and
after the controller receives confirmation that each transaction node is operating under the transition mode, instructing the transaction nodes to operate under the second mode.

9. A method for an online transaction system to transition from operating under a first mode where transaction nodes identify consecutive transactions with timestamps based on global clock servers (GCSs) coupled to the transaction nodes, to operating under a second mode where the transactions nodes identify sequential transactions with sequential identification numbers obtained from a global transaction server (GTS), the method comprising:
at a transaction node of the transaction nodes:
receiving a command to operate under a transition mode;
when in the transition mode,
obtaining, for a transaction conducted at the transaction node, a timestamp (ts) and a timestamp error bound (eb), the ts and the eb being based on the GCSs;
providing ts and eb to the GTS operating under the transition mode;
receiving from the GTS a modified timestamp (ts_reply) and a modified error bound (eb'); and
timestamping the transaction with ts_reply.

10. A method for an online transaction system to transition from operating under a first mode where transactions nodes identify sequential transactions with sequential identification numbers obtained from a global transaction server (GTS) to a second mode where the transaction nodes identify consecutive transactions with timestamps based on a global clock servers (GCSs) coupled to the transaction nodes, the method comprising:
at the GTS:
receiving a command to switch from operating under the first mode to operating under a transition mode;
when the GTS is operating under the transition mode:
for a transaction initiated after the GTS switched to operating under the transition mode:
receiving a transaction timestamp (ts) and an error bound (eb) of the timestamp from a particular transaction node, the ts and the eb being based on the GCSs, the GTS having associated thereto:
  an identification number of a last transaction conducted by the GTS,
  timestamps previously received (previous_tss) at the GTS, and
  error bounds of the timestamps previously received (previous_ebs) at the GTS;
obtaining a modified timestamp (ts_reply) by determining a maximum value between the ts, the previous_tss, and the identification number of the last transaction incremented by a pre-determined increment value;
determining a modified error bound (eb') by adding the eb to a difference between ts_reply and ts; and
providing the ts_reply and the eb' to the particular transaction node to cause the transaction node to timestamp the transaction with ts_reply, and to wait for a duration of eb' before requesting any further timestamp.

11. The method of claim 10, wherein receiving the command to switch from operating under the first mode to operating under a transition mode includes receiving the command from a controller, the method further comprising, at the GTS:
  receiving from the controller a request for a largest error bound value (Max_eb) between eb and the previous_ebs received at the GTS; and
  providing the Max_eb to the controller, the controller being configured to wait for a time interval equal to at least the Max_eb before instructing the transaction nodes to operate under the second mode.

12. The method of claim 11, further comprising, at the GTS:
  receiving a command to operate under the first mode; and
  when operating under the first mode, periodically receiving, from the GCSs, upper bound timestamp values, the GTS being configured to issue, upon request from a transaction node operating under the first mode, a transaction identification number greater than any of the upper timestamp values.

13. The method of claim 10, wherein the pre-determined increment value is equal to 1.

14. The method of claim 11, wherein the GTS is configured to reset Max_eb to zero after providing Max_eb to the controller.

* * * * *